United States Patent
van Cruyningen (10) Patent No.: US 9,635,259 B2
(45) Date of Patent: Apr. 25, 2017

(54) FORWARD MOTION COMPENSATED FLIGHT PATH

(71) Applicant: Izak Jan van Cruyningen, Saratoga, CA (US)

(72) Inventor: Izak Jan van Cruyningen, Saratoga, CA (US)

( * ) Notice: Subject to any disclaimer, the term of this patent is extended or adjusted under 35 U.S.C. 154(b) by 204 days.

(21) Appl. No.: 14/602,245

(22) Filed: Jan. 21, 2015

(65) Prior Publication Data

US 2016/0212345 A1    Jul. 21, 2016

(51) Int. Cl.
| | | |
|---|---|---|
| *H04N 7/18* | (2006.01) | |
| *G01C 11/02* | (2006.01) | |
| *H04N 5/232* | (2006.01) | |
| *G03B 15/00* | (2006.01) | |

(52) U.S. Cl.
CPC ....... *H04N 5/23267* (2013.01); *G03B 15/006* (2013.01); *H04N 5/232* (2013.01); *B64C 2201/123* (2013.01)

(58) Field of Classification Search
CPC ............ B64C 39/024; B64C 2201/127; B64C 2201/146; B64C 2201/141; B64C 2201/027; B64C 2201/123; B64C 19/00; B64C 2201/145; B64C 2201/021; B64C 2201/104; G03B 15/006; H04N 5/232
USPC ...... 348/36, 143, 144, 373; 701/2–4, 11, 23, 701/408
See application file for complete search history.

(56) References Cited

U.S. PATENT DOCUMENTS

| | | | |
|---|---|---|---|
| 2,570,130 A | 10/1951 | Kenyon | |
| 2,811,042 A | 10/1957 | Kenyon | |
| 5,155,597 A | 10/1992 | Lareau et al. | |
| 6,130,705 A * | 10/2000 | Lareau | G01C 3/08 |
| | | | 348/144 |
| 2013/0238170 A1* | 9/2013 | Klinger | G05D 1/104 |
| | | | 701/3 |
| 2014/0129056 A1* | 5/2014 | Criado | G05D 1/105 |
| | | | 701/4 |

FOREIGN PATENT DOCUMENTS

CN    202748029 A    2/2013

OTHER PUBLICATIONS

P. Fricker and R. Pacey, "Forward Motion Compensation (FMC)—Is it the same in the Digital Imaging World?" ASPRS Journal, Nov. 2005.

\* cited by examiner

*Primary Examiner* — Nathnael Aynalem (57) ABSTRACT

With reference to FIG. 1, camera 12 mounted on airframe 10 captures an image of first field of view 20 along first optical axis 21 aimed at first object of interest 23. During the time of exposure, airframe 10 flies first flight path arc 22 centered on first object of interest 23 with a radius substantially equal to the distance between camera 12 and first object of interest 23. Airframe 10 pivots camera 12 around first object of interest 23 while the shutter in camera 12 is open. This is repeated around each subsequent object of interest to produce a scalloped or slalom path, namely Forward Motion Compensated (FMC) flight path 33.

20 Claims, 5 Drawing Sheets

FORWARD MOTION COMPENSATED FLIGHT PATH

CROSS-REFERENCE TO RELATED APPLICATIONS

This application claims the benefit of provisional patent application Ser. No. 61/930,424 filed 2014 Jan. 22 by the present inventor.

BACKGROUND

Prior Art

Motion of a camera during image exposure causes blur in the image. In aerial imaging one source of camera motion is unexpected gusts or turbulence disturbing the airframe. This motion can be mitigated with gyroscopes such as those produced by Kenyon Labs (U.S. Pat. No. 2,811,042 and U.S. Pat. No. 2,570,130); or with image stabilization available in many consumer cameras and smart phones. This image stabilization uses gyroscope, inertial measurement unit (IMU), and accelerometer sensors to moves lenses or the sensor array in the camera, thereby compensating for the camera motion.

A second source of motion is the planned forward movement of the airframe across the field of view. This motion is present even in wind-still conditions, and generally cannot be detected or compensated by gyros or accelerometers since there is little acceleration or change in angular velocity in straight, level flight. Prior approaches to Forward Motion Compensation (FMC) include
- mechanically translating the film, sensor, or a lens;
- rotating a mirror, prism, or camera (CN 202748029 U); or
- translating the charges in the photo sites on an electro-optical array (U.S. Pat. No. 5,155,597, time delay and integration, astronomy orthogonal transfer CCD).

The last option is implemented for many expensive medium and large format cameras designed especially for aerial imaging, where it is known as time delay and integration.

Providing FMC for a camera in smooth flight is a difficult problem (U.S. Pat. No. 5,155,597 cites 40 sources) that is still very active (U.S. Pat. No. 5,155,597 is in turn referenced by 74! patents and applications). The breakthrough in the FMC flight path described here came when we turned the problem inside out; to paraphrase "Ask not what FMC can do for the camera in your airframe, ask what your airframe can do for FMC in your camera".

Blur due to forward motion for vertical aerial photography is measured by the amount of a ground sample distance (GSD) the airframe moves during exposure. The GSD is calculated as the object distance times the pixel dimension over the lens focal length. So for a 100 m flying height using a camera with 0.005 mm size pixels and a 25 mm focal length lens taking vertical pictures, the GSD is 2 cm. A common criterion for acceptable blur is that the airframe not move more than a fraction, say ½, of a GSD during the exposure time. So for an exposure time of $\frac{1}{1000}$ second, this criterion limits the ground speed in this scenario to 1 cm in $\frac{1}{1000}$ s or 10 m/s (36 km/hr or 22 mph).

Unmanned aerial vehicles (UAVs) operate primarily under autopilot control. They are typically lighter and more maneuverable than manned aircraft, and they fly at much lower heights (smaller GSD) due to government regulations. To achieve good flight speeds with a small GSD, forward motion compensation should be used. UAVs don't need to worry about airsickness.

SUMMARY

Forward motion compensation reduces blur due to planned airframe motion in images. As described in the following embodiments, this can be done by modifying the flight path to fly an arc around the object of interest during the time of exposure.

Figure 1:
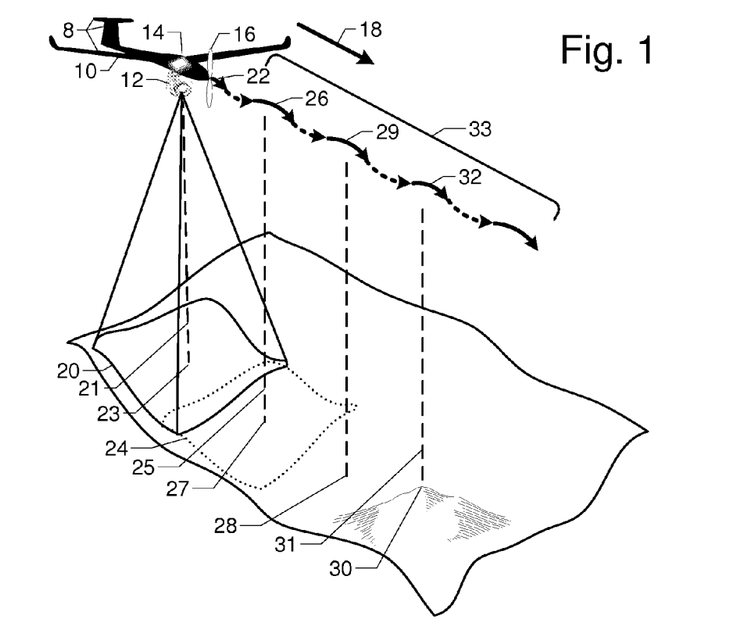

With reference to FIG. 1, camera 12 mounted on airframe 10 captures an image of first field of view 20 along first optical axis 21 aimed at first object of interest 23. During the time of exposure, airframe 10 flies first flight path arc 22 centered on first object of interest 23 with a radius substantially equal to the distance between camera 12 and first object of interest 23. Airframe 10 pivots camera 12 around first object of interest 23 while the shutter in camera 12 is open. This is repeated around each subsequent object of interest to produce a scalloped or slalom path, namely Forward Motion Compensated (FMC) flight path 33.

ADVANTAGES

Although forward motion compensation is well known in the prior art, various aspects of the embodiments of my FMC flight path are improvements because:
They do not add any
  a. weight,
  b. mechanical complexity, nor
  c. electronic complexity.
For the same blur criterion they allow one or more of
  a. a longer exposure (more light so less noise),
  b. a slower lens f# (lighter, less expensive lens),
  c. imaging in lower light conditions (sunrise, twilight, or overcast),
  d. greater depth of field (focusing less critical), or
  e. faster flight.
Other advantages of one or more aspects will be apparent from a consideration of the drawings and ensuing description.

FIGURES

1. Perspective view of FMC flight path for an aerial survey.
2. Section along flight path for one exposure in an aerial survey.
3. Perspective view of FMC flight path for inspecting power lines.
4. Section across flight path for power line inspection.
5. Front view of a focal plane shutter.
6. Perspective view of FMC flight path for forward oblique images.
7. Perspective view of FMC flight path for side oblique images.
8. Flow chart for FMC flight path implementation.

DETAILED DESCRIPTION

This section describes several embodiments of the Forward Motion Compensated Flight Path with reference to FIGS. 1-8.

FIG. 1. is a perspective view (not to scale) of an aerial survey taking images of multiple overlapping fields of view. Camera 12, autopilot 14, control surfaces 8, and propulsion system 16 are mounted on airframe 10 flying in planned flight path 18. Control surfaces 8 consist of one or more of elevator, rudder, ailerons, flaps, or combinations thereof (e.g. elevon). Camera 12 images first field of view 20 along first optical axis 21 aimed at first object of interest 23. First flight path arc 22 is centered on first object of interest 23 with radius substantially equal to the distance between camera 12 and first object of interest 23 along optical axis 21.

Second optical axis 25 points to second object of interest 27 at the center of second field of view 24. Second flight path arc 26 is centered on second object of interest 27 with radius matching the distance between camera 12 when it gets to this point in the flight path and second object of interest 27 along second optical axis 25.

Third flight path arc 29 is centered on third object of interest 28 and has radius equal to the distance between camera 12 when it gets to this point in the flight path and third object of interest 28. As the fourth object of interest, hill 30 increases the height of the ground so fourth flight path arc 32 has a smaller radius corresponding to the reduced object distance along fourth optical axis 31. The combination of arcs 22, 26, 29, and 32, and the flight segments joining them produces forward motion compensated flight path 33.

In preparing for exposure for first field of view 20, autopilot 14 adjusts control surfaces 8 to orient and maintain airframe 10 in flight along first flight path arc 22. First flight path arc 22 has radius equal to the distance between first object of interest 23 and camera 12 along first optical axis 21 and is oriented to keep the object end of first optical axis 21 in one position. Airframe 10 pivots camera 12 around the object end of first optical axis 21, i.e. around first object of interest 23, while the shutter in camera 12 is open. Autopilot 14 may also turn off propulsion system 16 to reduce blur due to vibration.

Images used for photogrammetry in aerial surveys should be taken vertically, with tilts up to 3 degrees acceptable. For vertical images, first flight path arc 22 is oriented along the pitch axis of airframe 10. For the example given previously with a flying height of 100 m, +/−3 degrees corresponds to an arc length of ~10.5 m. The FMC ground speed is thus limited by the length 10.5 m in $\frac{1}{1000}$s exposure time, rather than the $\frac{1}{2}*2$ cm GSD. Thus airframe 10 could fly a thousand times faster, or the exposure time can be increased, or the lens stopped down, or some combination of these.

After the shutter (not shown in FIG. 1) in camera 12 closes at the end of first flight path arc 22, autopilot 14 starts propulsion system 16 (if it was stopped), adjusts control surfaces 8 to reduce pitch and fly towards the second field of view 24 or the next waypoint. At second field of view 24 the process is repeated to fly second flight path arc 26 pivoting second optical axis 25 around second object of interest 27 while the shutter for camera 12 is open. The resulting FMC flight path 33 is a series of arcs 22, 26, 29, 32 centered on the objects of interest at the center of the fields of view, connected by more freeform paths shown as dashed lines.

Figure 2:
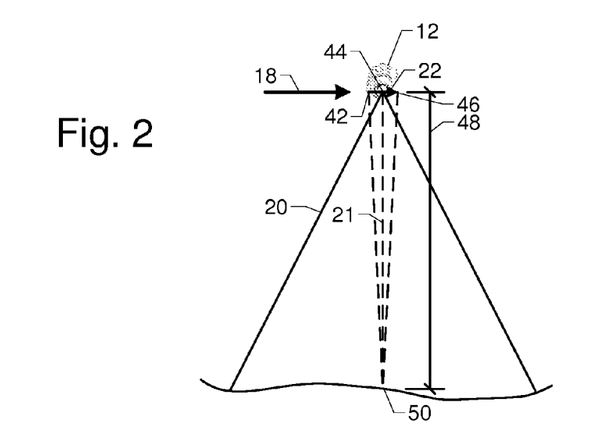

FIG. 2. is a section of the flight path along planned flight path 18 for one exposure. A flight plan is usually generated prior to flight to guide autopilot 14. It is often communicated as a series of waypoints that are stored on autopilot 14 prior to flight. Autopilot 14 contains a processor and memory and controls the flight using control surfaces 8. During flight autopilot 14 navigates airframe 10 between waypoints using segments such a planned flight path 18. Images are acquired either as quickly as possible for camera 12, or at predefined waypoints. To take a blur-free image of first field of view 20 along optical axis 21 pointing to object 50 with camera 12 at vertical position 44, the flight path is slightly modified. Rather than simply flying straight and level along planned flight path 18, the flight path is curved from start of arc 42 to end of arc 46, while the shutter on camera 12 is open. The linear translational motion of planned flight path 18 is replaced with angular motion along first flight path arc 22 while the shutter is open. The arc is centered on object 50 and the radius of the arc is object distance 48, from camera 12 to object 50.

For fairly level terrain, planned flight path 18 is often straight and level flight. For terrain with large elevation changes, the flight plan may follow the terrain elevations more closely. The object distance is still calculated as the distance from the ground to the camera at the point of exposure. The FMC flight path is a small variation on the flight plan with arcs at each exposure.

Figure 3:
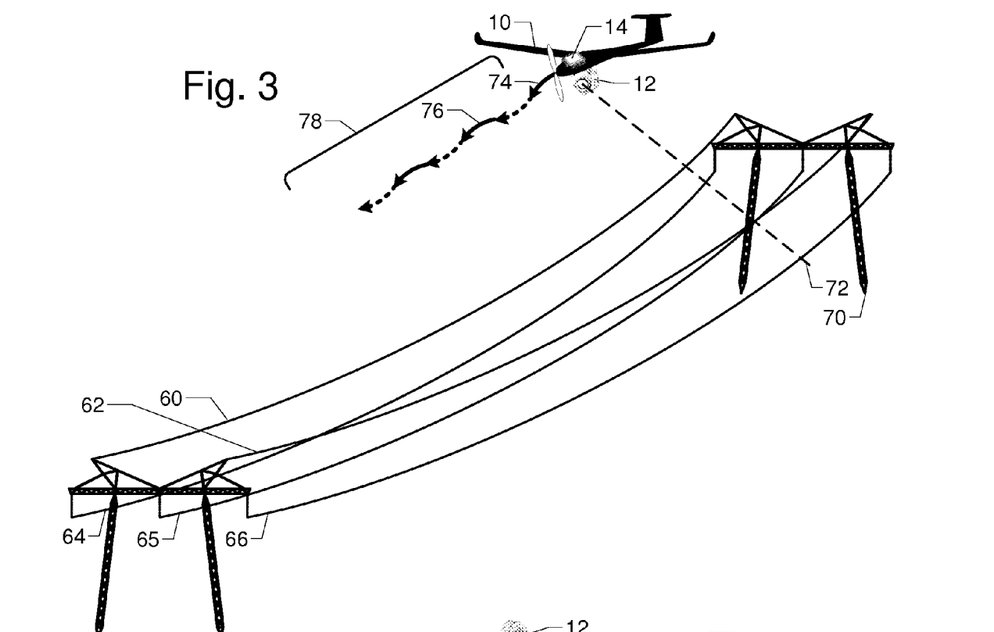

FIG. 3. is a perspective view (not to scale) of aerial inspection of power lines. In this example for 345 kV transmission lines, shield wires 60 and 62 are 1-2 cm in diameter and have to be inspected for lighting strikes. Phase conductors 64, 65, and 66 are 3-5 cm in diameter with a steel core and stranded aluminum conductors that have to be inspected for corrosion, broken strands, failing spacers, failing dampers, or splice failures. Phase conductors are ~10 m apart, and towers 68 and 70 are 200-600 m apart. Airframe 10 with autopilot 14 is flying a planned catenary arc above shield wire 60 with camera 12 at a side oblique angle along optical axis 72. Rather than a linear path such as planned flight path 18, the planned flight path is a catenary arc to closely follow shield wires 60 and 62 and phase conductors 64, 65, and 66. Superimposed on the planned catenary flight path are FMC arcs 74 and 76 to give the FMC catenary flight path 78.

Figure 4:
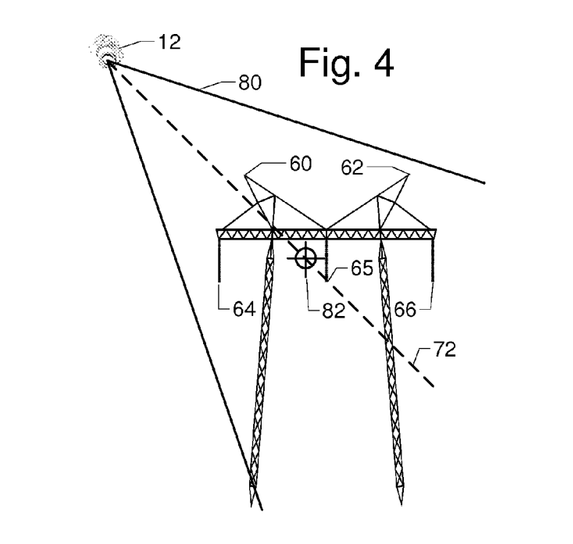

FIG. 4 is a section across the transmission lines and flight path 78. To inspect all five wires 60, 62, 64, 65, and 66 in one flight, camera 12 is oriented with field of view 80. Optical axis 72 is roughly 45 degrees off the horizontal to provide better stereo images when the wires are imaged with a second flight on the other side. The two flights together provide good coverage of the uppermost parts of the wires that are not visible from the ground. Virtual object location 82 is chosen to reduce the forward motion blur for all the wires in the image, as described below.

To be able to see damage on phase conductor 65 requires resolution of a number of pixels, say 6, across the diameter of the wire. This gives a wire sample distance (by analogy to our GSD) of 40/6~7 mm, so for our example camera with 25 mm focal length lens and 0.005 mm pixels, camera 12 should be within 33 m of phase conductor 65. With a $\frac{1}{1000}$s exposure time and a blur criterion of ½ wire sample distance, this gives a maximum inspection speed of 3.3 m/s. This is painfully slow, and is probably below the stall speed of a fixed wing UAV that can carry even a lightweight consumer camera.

To make this inspection practical, autopilot 14 controls airframe 10 to fly a catenary arc to track phase conductor 65 elevation, with superimposed flight path arcs 74, 76, and one more for each inspection image. Flight path arcs 74 and 76 lie in a plane oblique to the horizon in the plane swept out by optical axis 72, with a radius equal to the object distance along optical axis 72. The object in the example of the previous paragraph being phase conductor 65, so the radius is 33 m. For this example, forward motion corrected catenary flight path 78 is the catenary of the conductors, modified by flight path arcs 74, 76, and one more for each image, as well as the flight segments joining the arcs.

When a single object is the primary focus of the inspection, like phase conductor 65 in the previous two paragraphs, then the object distance is simply the distance from the camera to that object. When additional objects at different distances are to be inspected in one image, then a virtual object location 82 can be calculated to reduce forward motion blur for all the objects of interest. In FIG. 4. camera 12 would be flown in an arc coming out of the page towards the viewer. Consider camera 12 as pivoting around virtual object location 82, then the relative motion at shield wire 60 and phase conductor 64 would also be out of the page, whereas the relative motion at shield wire 62 and phase conductors 65 and 66 would be into the page, away from the viewer. As a first approximation, virtual object location 82 is chosen to be the average of the distances from camera 12 to each of the objects of interest 60, 62, 64, 65, and 66, i.e. at the average location. If some objects are more important, then they can be weighted more heavily in the average. For a known arrangement of objects of interest 60, 62, 64, 65, and 66, virtual object location 82 is calculated using a simple or weighted average by a separate computer doing flight planning (not shown) or during the flight using autopilot 14.

The autofocus in consumer cameras calculates object distances for thousands of points and tries to determine the best setting for the focus. However, it does not know, a priori, the importance of different points in the inspection. For a field of view such as 80, it mostly measures the distant ground and not the five wires of interest. For the inspection illustrated in FIGS. 3 and 4, the configuration of wires is known. Based on the inspection objectives, a better estimate of virtual location 82 can often be calculated either during flight planning or during flight by autopilot 14.

Figure 5:
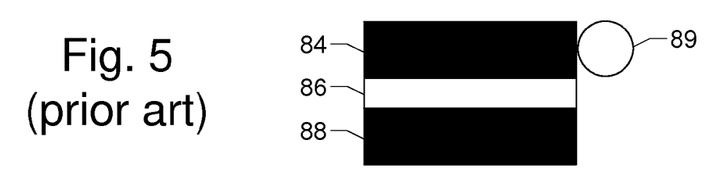

FIG. 5 is a front view of a focal plane shutter typical of many consumer cameras. Just in front of the photosensitive array are opaque top shutter 84 and bottom shutter 88. Prior to an exposure, both shutters are at the top of the frame. The exposure starts with bottom shutter 88 moving down at a speed ~1-10 m/s. For exposure times longer than the flash sync time (typically $1/125$-$1/250$s), bottom shutter 88 reaches the bottom of the frame before top shutter 84 starts to move. The whole photosensitive array is exposed during the time of the flash.

For exposure times shorter than the flash sync speed, top shutter 84 starts to move down at the same speed as bottom shutter 88, after a delay equal to the exposure time, thus forming a slit 86 between the shutters. The height of slit 86 divided by the shutter speed equals the exposure time.

The focal plane shutters in most consumer cameras are driven by springs and move at 5-8 m/s. The Panasonic Lumix GM1™ uses a shutter stepper motor 89. Instead of bottom shutter 88, this camera uses an electronic first curtain which clears the rows of pixels of charge as it moves down the sensor. This shutter has a sync speed of $1/50$s and it travels at about 1 m/s. The slower speed and controllable shutter stepper motor 89 are a good match for the FMC applications described below. All-electronic shutters can be even slower and potentially easier to match to airframe responsiveness.

Note that for exposure times shorter than the flash sync time, the photosensitive elements are not all exposed at the same instant in time. The top of the image (bottom of the object since the lens inverts) is exposed before the bottom of the image (top of object). For fast moving objects this can lead to rolling shutter artifacts, such as leaning forward in the direction of motion.

Figure 6:
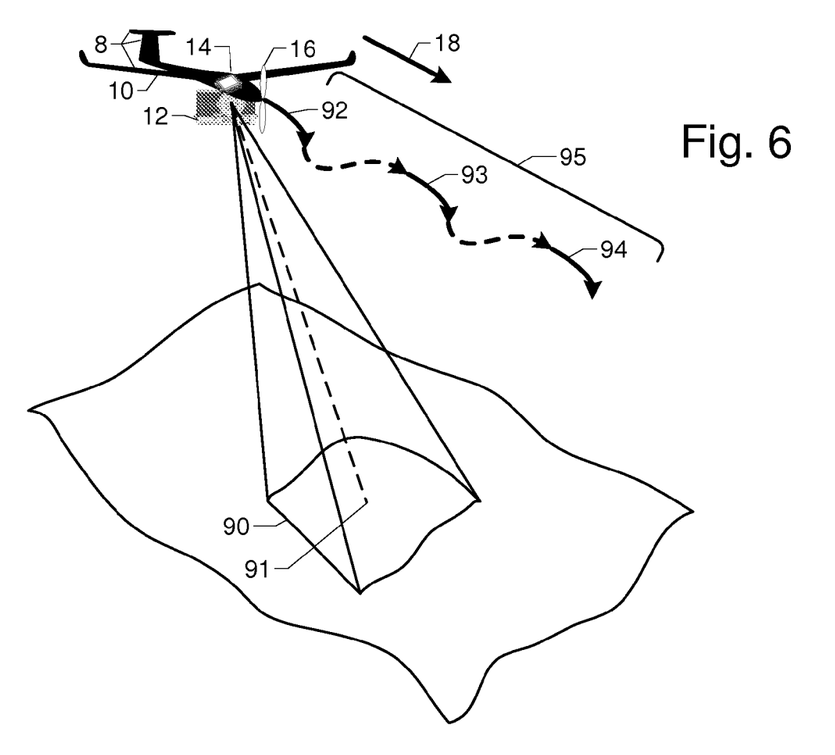

This difference in time of exposure can be used to advantage in forward motion compensated flight paths. FIG. 6. shows airframe 10 with control surfaces 8, camera 12, autopilot 14, and propulsion system 16 flying along planned flight path 18. Camera 12 is mounted upside down pointing forward and down to image upcoming terrain in forward looking field of view 90 along forward oblique optical axis 91. On flat ground, forward looking field of view 90 is a trapezoid. Further points at larger object distances at the front of trapezoidal field of view 90 need less FMC, whereas closer points at shorter object distances at the back of trapezoidal field of view 90 need more FMC. Decreasing radius FMC arcs 92, 93, and 94 start fairly straight and then pitch more and more in smaller radii during the time of exposure.

The exposure time on camera 12 is set shorter than the flash sync time, so slit 86 sweeps across the photosensitive array from bottom to top (camera is upside down compared to FIG. 5). The furthest points in forward looking field of view 90 are exposed first. These correspond to large object distances so radius of arc 92 is large at first. As slit 86 sweeps up the photosensitive array, closer points in forward looking field of view 90 are exposed, so the object distances decrease, and the radius of arc 92 decreases. This decreasing radius flight arc corresponds well with the response of an airframe to dive or nose down pitch control. Control of the slit speed using shutter stepper motor 89 or an all-electronic shutter allows control over how fast the radius is reduced, making it easier to match to responsiveness of airframe 10. Decreasing radius FMC arcs 93 and 94 correspond to subsequent images and join together with connecting segments to make forward oblique FMC flight path 95.

Figure 7:
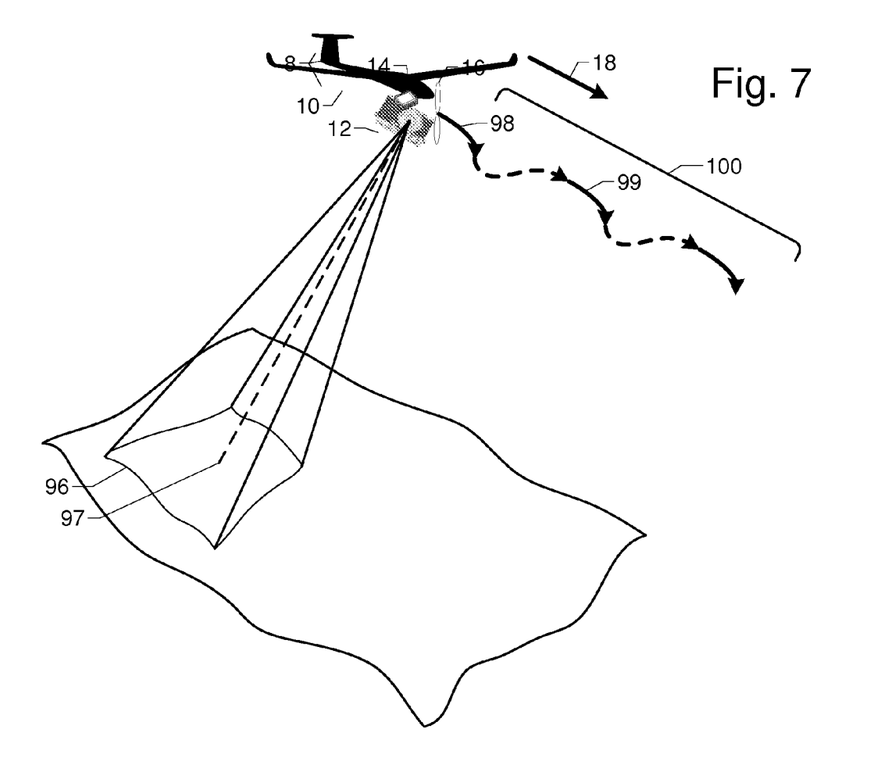

FIG. 7. shows airframe 10 with control surfaces 8, camera 12, autopilot 14, and propulsion system 16 flying along planned flight path 18. Camera 12 is mounted upside down pointing sideways and down to image terrain in side looking field of view 96 along side oblique optical axis 97. On level ground, side looking field of view 96 is a trapezoid. Further points at larger object distances at the far side of trapezoidal field of view 96 need less FMC, whereas closer points at shorter object distances at the near side of trapezoidal field of view 96 need more FMC. Decreasing radius FMC arcs 98 and 99 start fairly straight and then curve in smaller and smaller radii during the time of exposure.

The exposure time on camera 12 is set shorter than the flash sync time, so slit 86 sweeps across the photosensitive array from bottom to top (camera is upside down compared to FIG. 5). The furthest points in side looking field of view 96 are exposed first. These correspond to large object distances so radius of arc 98 is large at first. As slit 86 sweeps up the photosensitive array, closer points in side looking field of view 96 are exposed, so the object distances decrease, and the radius of arc 98 decreases. Decreasing radius FMC arcs 99 corresponds to a subsequent image. These arcs join together with connecting segments to make side oblique FMC flight path 100.

Figure 8:
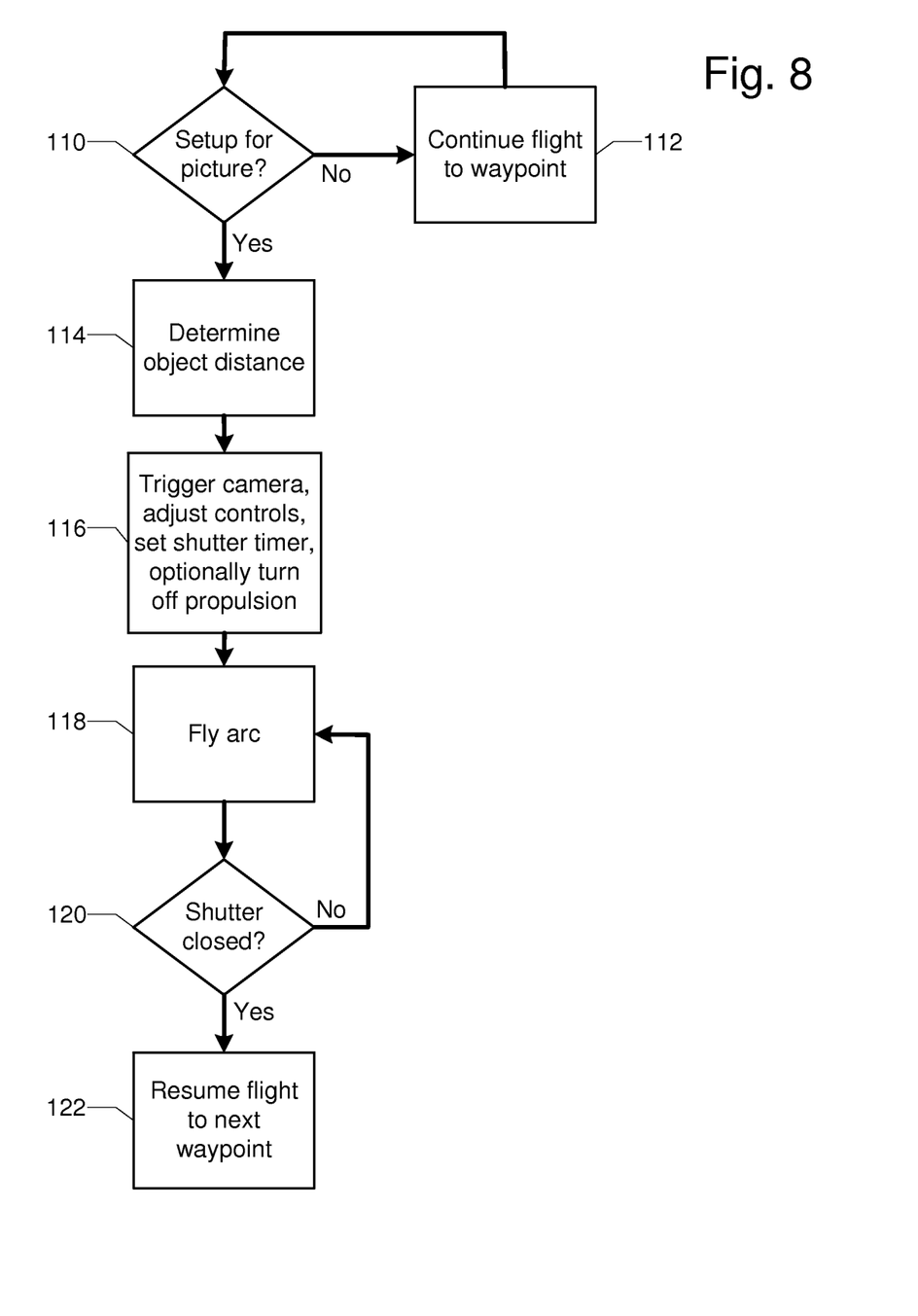

FIG. 8 is a flowchart showing how to implement forward motion compensated flight path 33 to take a single image. This would be repeated for each subsequent image. The assumption is that airframe 10 is flying along planned flight path 18 either from the start of the flight, from a prior waypoint, or from taking a prior image. Setup for picture decision 110 is whether airframe 10 is close enough that camera 12 can image field of view 20. Taking a picture has to be anticipated because both camera 12 and airframe 10 take time to set up.

Consumer cameras have a delay of $1/20^{th}$ to $1/4$ second from the time they are triggered until the time the shutter opens. This time can be reduced by prefocusing or by using manual focus. An airframe can be very maneuverable and on the edge of stability like a jet fighter, or very stable and slow responsive like an airliner. More maneuverable airframes respond more quickly to changes in control. From the time the controls are adjusted, there will be a delay of tens of milliseconds until the airframe is in the new attitude.

For a given camera and airframe, the setup times can be measured and stored on autopilot 14 before the flight. The current location and groundspeed can be determined a) from GPS/GNSS or b) from recognizable features on the ground and the airspeed less the wind speed. Given the setup times, the current location, and the current groundspeed, setup for picture decision 110 can be made.

If airframe 10 is not close enough to begin setup for picture 110, then it continues flight to waypoint process 112. If airframe 10 is close enough then it has to determine object distance process 114 by one of the means described in the following three paragraphs. For an aerial survey with vertical images, as illustrated in FIGS. 1 and 2, the object distance is the height above ground. The ground elevation comes from a map or a digital elevation model (DEM), and the altitude of airframe 10 comes from an altimeter. Alternatively the distance to the object of interest can be measured with RADAR, LiDAR, SONAR, or other well-known distance measuring tools.

For the aerial inspection illustrated in FIGS. 3 and 4, the object distance is determined in the flight plan to be close enough to get the desired wire sample distance. For a single object of interest, the object distance is the distance from the camera to the object. For close distances the camera autofocus will measure the distance. If there are multiple objects of interest, e.g. wires 60, 62, 64, 65, 66 in FIG. 4, at different distances in one image, a virtual object location 82 may be calculated to reduce the forward motion blur over all the objects of interest. A first approximation is to simply average the distances. Then the radius used for the FMC arc is the distance from camera 12 to virtual object 82.

For forward oblique imaging FIG. 6 and side oblique imaging FIG. 7; use trigonometry with the height above ground, the camera angle of declination, and the lens angle of view to determine the furthest and closest object distances, at the far and near ends of the trapezoidal field of view assuming flat ground. To continue the earlier example, suppose camera 12 has 4800 pixels of dimension 0.005 mm in the vertical direction, i.e. the light sensitive sensor is 24 mm high. Then with a 25 mm focal length lens the vertical angle of view is 51 degrees. If in FIG. 6, forward oblique optical axis 91 is inclined 45 degrees up from vertical, then the furthest points of trapezoid 90 are 71 degrees up from vertical and the closest points of trapezoid 90 are 19 degrees up from vertical. For a flying height of 100 m and assuming flat terrain, the furthest points at the front of trapezoidal field of view 90 will be 302 m away and the closest points at the back of trapezoidal field of view 90 will be 106 m away. Arc 92 will start with radius of 302 m and decrease to radius 106 m as slit 86 is scanned from back to front across light sensitive array of camera 12.

Trigger camera, adjust controls, set shutter timer, and optionally turn off propulsion process 116 are four steps to prepare for taking a photo. The order of triggering the camera or adjusting the controls depends on whether the camera or airframe has the greater delay. A shutter timer is set based on the camera delay plus the shutter time, to know when to stop flying FMC arc 22. For an airframe that can glide for the duration of the shutter open time, the propulsion may be turned off to reduce blur due to vibration. This is easy for fixed wing airframes, less so for rotary wings. Once all four steps are completed, the airframe will fly arc process 118. For a stable airframe control surfaces 8 may have to be feathered to maintain the arc, but for an airframe with neutral stability it may be sufficient to get the airframe into the correct configuration. For the reducing radii arcs for the forward oblique FIG. 6 and side oblique FIG. 7 imaging, the control surfaces 8 have to be adjusted to tighten the arc.

In the loop between fly arc process 118 and shutter closed decision 120, the shutter timer is decremented. When the shutter is closed, the airframe will resume flight to next waypoint process 122.

This section illustrated details of specific embodiments, but persons skilled in the art can readily make modifications and changes that are still within the scope. For example, the discussion and illustrations featured a fixed wing UAV airframe with an autopilot and propeller. The same concepts apply to manned airframes, jet engines, as well as to rotary wing airframes. For a helicopter, flight control is exercised through pitch angle of the main rotor and speed of the tail rotor. For a multicopter, flight control is through differential motor speeds. The power line inspection example was for a high voltage transmission line, but the same concepts apply to distribution lines, communication lines, electric railway lines, ski lift cables, suspension bridges, towers, and oblique aerial photography. Accordingly, the scope should be determined not by the embodiments illustrated, but by the appended claims and their legal equivalents.

I claim:

1. An aerial photography system to take an image of an object, comprising:
   an airframe,
   a camera mounted on said airframe,
   a shutter for said camera,
   distance estimating means to estimate an object distance between said camera and said object,
   an autopilot to direct said airframe to fly an arc centered on said object with a radius substantially equal to said object distance while said shutter is open,
   whereby blur in said image from motion of said airframe is substantially reduced.

2. The aerial photography system of claim 1, further comprising a propulsion system for said airframe that is turned off while said shutter is open and that is turned on while said shutter is closed, whereby blur in said image from vibration of said propulsion system is avoided.

3. The aerial photography system of claim 1, further comprising
   a planned flight path designed to capture a plurality of images of a corresponding number of objects of interest,
   where for each image and corresponding object of interest in turn, a corresponding object of interest distance between said camera and the corresponding object of interest is estimated with said distance estimating means and said autopilot directs said airframe to fly a corresponding arc centered on said corresponding object of interest with a corresponding radius substantially equal to said corresponding object of interest distance while said shutter is open to record said each image,
   whereby forward motion is compensated for each image with a flight path slightly modified from said planned flight path.

4. The aerial photography system of claim 1 to take another image containing a plurality of objects of interest at different distances from said camera, further comprising a virtual object location calculated with a weighted average based on importance and location of each object of interest in said other image, said autopilot flies an arc centered on said virtual object location with a radius substantially equal to the distance between said camera and said virtual object location while said shutter is open to capture said other image, whereby forward motion blur is reduced for said plurality of objects of interest in said other image.

5. The aerial photography system of claim 4, further comprising
a planned flight path designed to capture a plurality of images with a corresponding number of virtual object locations,
where for each image and corresponding virtual object location in turn, said autopilot directs said airframe to fly a corresponding arc centered on said corresponding virtual object location with a corresponding radius substantially equal to a corresponding distance between said camera and said corresponding virtual object location while said shutter is open to record said each image,
whereby forward motion is compensated for each object of interest in each image with a flight path slightly modified from said planned flight path.

6. The aerial photography system of claim 1, wherein
said camera is mounted on said airframe for a forward oblique principal axis in a direction of travel of said airframe,
said shutter is a focal plane rolling shutter such that a slit of a light sensitive surface in said camera records light at one time,
said slit is scanned across said light sensitive surface in an opposite direction to said motion of said airframe,
said autopilot directs said airframe to fly an other arc with increasing pitch while radius decreasing as said slit exposes said light sensitive surface corresponding to objects closer to said camera in said image,
whereby forward motion compensation is greater for nearby objects than objects far forward of said airframe.

7. The aerial photography system of claim 6, further comprising
a planned flight path designed to capture a plurality of sequential images where said autopilot directs said airframe to fly said other arc for each of said sequential images.

8. The aerial photography system of claim 1, wherein
said camera is mounted on said airframe for a side oblique principal image axis compared to a direction of travel,
said shutter is a focal plane rolling shutter such that a slit of a light sensitive surface in said camera records light at one time,
said slit is scanned across said light sensitive surface from a far side to a near side of said side oblique principal image axis,
said autopilot directs said airframe to fly an other arc in a plane formed by said side oblique principal axis and a forward direction of said airframe with a radius towards said side oblique principal axis decreasing as said slit exposes said light sensitive surface corresponding to objects closer to said camera in said image,
whereby forward motion compensation is greater for nearby objects than objects far to the side of said airframe.

9. The aerial photography system of claim 8, further comprising a planned flight path designed to capture a plurality of sequential images where said autopilot directs said airframe to fly said other arc for each of said sequential images.

10. A method for forward motion compensation while acquiring an image of an object with a camera mounted on an airframe comprising:
determining an object distance between said camera and said object,
flying said airframe in an arc centered on said object with a radius substantially equal to said object distance while a shutter of said camera is open,
whereby blur in said image from motion of said airframe is substantially reduced.

11. The method of claim 10 further comprising:
turning off a propulsion system for said airframe while said shutter of said camera is open,
turning on the propulsion system for said airframe while said shutter of said camera is closed,
whereby blur in said image from vibration of said propulsion system is reduced.

12. The method of claim 10 further comprising:
taking a plurality of sequential images of corresponding objects along a flight path,
modifying said flight path for each sequential image in turn so as to fly an arc centered on the corresponding object with a corresponding radius substantially equal to the corresponding distance between said camera and said corresponding object while said shutter of said camera is open to take said each sequential image,
whereby blur from forward motion of said airframe is reduced in said plurality of sequential images.

13. The method of claim 10 for acquiring an other image with a plurality of objects of interest at different distances in said other image, further comprising:
calculating a virtual object location as a weighted average of locations of said objects of interest,
flying said airframe in an arc centered on said virtual object location with a radius substantially equal to the distance between said camera and said virtual object location while shutter of said camera is open,
whereby blur from forward motion of said airframe is reduced for said plurality of objects of interest in said other image.

14. The method of claim 13 further comprising:
taking a plurality of sequential images of corresponding virtual object locations along a flight path,
modifying said flight path for each sequential image in turn so as to fly a corresponding arc centered on the corresponding virtual object location with a corresponding radius substantially equal to the corresponding distance between said camera and said corresponding virtual object location while shutter of said camera is open to take said each sequential image,
whereby blur from forward motion of said airframe is reduced in said plurality of sequential images for said plurality of objects of interest in each sequential image.

15. The method of claim 10 further comprising:
mounting said camera on said airframe for a forward oblique principal axis in a direction of travel of said airframe,
scanning a slit across a light sensitive surface of said camera from back to front compared to the direction of travel of said airframe,
flying said airframe in an other arc with increasing pitch where a radius of the other arc initially equals a furthest distance at front of forward oblique field of view corresponding to said forward oblique principal axis and decreases to a closest distance at back of said forward oblique field of view as said slit is scanned across said light sensitive surface of said camera, whereby the forward motion compensation more closely matches different distances in said forward oblique field of view.

16. The method of claim 15 further comprising:

taking a plurality of sequential images along a planned flight path where for each sequential image in turn, an autopilot directs said airframe to fly said other arc.

17. The method of claim 10 further comprising:

mounting said camera on said airframe for a side oblique principal axis compared to a direction of travel of said airframe, scanning a slit across a light sensitive surface of said camera from a far to a near side of said side oblique principal axis, flying said airframe in an other arc in a plane formed by said side oblique principal axis and a forward direction of motion of said airframe with an other radius towards said side oblique principal axis where the other radius of said other arc initially equals a furthest distance at a far side of side oblique field of view corresponding to said side oblique principal axis and decreases to a closest distance at a near side of said side oblique field of view as said slit is scanned across said light sensitive surface of said camera, whereby forward motion compensation more closely matches different distances in said side oblique field of view.

18. The method of claim 17 further comprising:

taking a plurality of sequential images along a planned flight path where for each sequential image in turn, an autopilot directs said airframe to fly said other arc.

19. The aerial photography system of claim 1, wherein said shutter is closed at an end of the flight of said arc.

20. The method of claim 10 further comprising, after flying said airframe in said arc, closing said shutter at an end of the flight of said arc.

* * * * *